(12) United States Patent  (10) Patent No.: US 9,195,327 B2
Ito et al.  (45) Date of Patent: Nov. 24, 2015

(54) TOUCH PANEL AND DISPLAY DEVICE EMPLOYING THE SAME

(71) Applicant: NLT Technologies, Ltd., Kawasaki, Kanagawa (JP)

(72) Inventors: Yukihiro Ito, Kawasaki (JP); Ichiro Hazeyama, Kawasaki (JP); Shizuo Morishita, Kawasaki (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 251 days.

(21) Appl. No.: 13/731,669

(22) Filed: Dec. 31, 2012

(65) Prior Publication Data

US 2013/0241850 A1    Sep. 19, 2013

(30) Foreign Application Priority Data

Feb. 17, 2012  (JP) .................................. 2012-033448

(51) Int. Cl.
    *G06F 3/041* (2006.01)
    *G06F 3/045* (2006.01)
(52) U.S. Cl.
    CPC .............. *G06F 3/041* (2013.01); *G06F 3/045* (2013.01); *G06F 3/0416* (2013.01)
(58) Field of Classification Search
    None
    See application file for complete search history.

(56) References Cited

U.S. PATENT DOCUMENTS

| | | | |
|---|---|---|---|
| 2003/0080716 A1* | 5/2003 | Kao | 323/266 |
| 2004/0135769 A1* | 7/2004 | Okada et al. | 345/156 |
| 2005/0076824 A1* | 4/2005 | Cross et al. | 116/205 |
| 2009/0207140 A1* | 8/2009 | Hansson | 345/173 |
| 2009/0266624 A1* | 10/2009 | Kondoh et al. | 178/18.05 |
| 2009/0278811 A1* | 11/2009 | Kong et al. | 345/173 |
| 2010/0085315 A1* | 4/2010 | Hsih | 345/173 |
| 2011/0012865 A1* | 1/2011 | Nozawa | 345/174 |
| 2011/0037722 A1* | 2/2011 | Tseng et al. | 345/174 |
| 2011/0134072 A1* | 6/2011 | Li et al. | 345/174 |
| 2011/0167922 A1* | 7/2011 | Krause et al. | 73/808 |
| 2012/0154309 A1* | 6/2012 | Yoshifusa et al. | 345/173 |
| 2012/0229413 A1* | 9/2012 | Fang et al. | 345/174 |
| 2012/0299872 A1* | 11/2012 | Nishikawa et al. | 345/174 |

FOREIGN PATENT DOCUMENTS

| | | |
|---|---|---|
| JP | 11-143622 A | 5/1999 |
| JP | 2005-128819 A | 5/2005 |
| JP | 2005-182339 A | 7/2005 |

* cited by examiner

*Primary Examiner* — Seokyun Moon
*Assistant Examiner* — Josemarie G Acha, III
(74) *Attorney, Agent, or Firm* — Sughrue Mion, PLLC

(57) ABSTRACT

The present invention provides a touch panel with features enabling the external form to be downsized without degrading a detection accuracy of a touch input area and applying an electric voltage to a pair of the electrodes and detecting the output electric voltages inverting the polarity of the voltage. A touch panel of the present invention uses the principle of Apollonius' circle for the touch position detection. Said touch panel is fabricated so that two substrates having a transparent conductive film thereon are place in a manner that said each transparent conductive film is facing each other. A first substrate has one electrode and a second substrate has two pairs of point electrodes. Said two pairs of the point electrodes are arranged in a circumference region of said second substrate. An insulation layer is formed in said circumference region excluding the region where said two pairs of the point electrodes are formed, and wirings extracting said two pairs of the electrodes outwards are formed on said insulation layer and arranged in the region inner than said two pairs of point electrodes are formed.

7 Claims, 19 Drawing Sheets

FIG. 5A

|  | Electrode A | Electrode B | Electrode C | Electrode D |
|---|---|---|---|---|
| Stand-by state | VDD | Hi – Z | Hi – Z | Hi – Z |
| State 1 | VDD | Hi – Z | GND | Hi – Z |
| State 2 | Hi – Z | VDD | Hi – Z | GND |
| State 3 | GND | Hi – Z | VDD | Hi – Z |
| State 4 | Hi – Z | GND | Hi – Z | VDD |

FIG. 11A

|  | Electrode A | Electrode B | Electrode C | Electrode D |
|---|---|---|---|---|
| Stand-by state | VDD | Hi – Z | Hi – Z | Hi – Z |
| State 1 | VDD | Hi – Z | GND | Hi – Z |
| State 2 | Hi – Z | VDD | Hi – Z | GND |
| State 3 | GND | Hi – Z | VDD | Hi – Z |
| State 4 | Hi – Z | GND | Hi – Z | VDD |

TOUCH PANEL AND DISPLAY DEVICE EMPLOYING THE SAME

FIELD OF THE INVENTION

The present invention relates to a touch panel and a display device employing the same, especially for use in a touch panel and a display device employing the same having the display shapes other than rectangular ones.

DESCRIPTION OF THE RELATED ART

The resistive touch panels have generally rectangular shapes in their substrates and are applied to the front portions of the displays having rectangular shapes as well. However, displays having their shapes other than rectangular such as circular have been developed in recent years, and the touch panels fit into those displays have been also required.

In the case of using the rectangular substrates, since the electrodes used for applying a electric voltage to a transparent conductive film is formed along the two sides facing each other, the electric voltage of an arbitrary point between the two electrodes is proportional to the ratio of the distances between the point and the two electrodes when a constant electric voltage is applied to the two electrodes and this feature enables easy detection of the position.

However, when the shapes of the substrates are other than rectangular such as circular, it is impossible to form the electrodes enabling an application of a uniform electric field to the transparent conductive film on the substrate. Therefore, traditional four-wire or five-wire resistive methods can offer no solution to these cases.

Moreover, it is almost impossible to narrow the width of the architraves of the panels which do not contribute to the detection of the touch when the shapes of the panels are such other than rectangular ones.

For example, the patent document 1 (hereinafter referred to as PD1) discloses an invention concerning the touch panels having circular and oval shapes. More specifically, it describes the touch panel "facing an upper and a lower substrates with a constant gap apart and bonded them at the circumference of said substrates with an adhesive material, wherein said upper substrate comprises a upper transparent conductive electrode formed underneath a flexible transparent substrate to have the sides whose number is a multiple of 4, such as the octagonal and the dodecagon, and formed to be symmetric against at least one central line and a pair of upper conducting electrodes formed on the counter sides facing symmetrically with said upper transparent conductive electrodes, and said lower substrate comprises a lower transparent conductive electrode formed to have a size nearly equal to the upper transparent conductive electrode on the upper surface of said lower transparent substrate, a pair of said lower conducting electrodes formed on the side facing but deviating 90 degrees compared to the side where said upper conductive electrode is formed, and the dot spacers formed on the upper surface of said lower transparent conductive electrode." PD1 discloses the method detecting the touched position by using 3 electrodes, the upper conducting electrode, the lower transparent conductive electrode and the lower conducting electrode, and utilizing a look-up table for compensating the distortion of the detection plane in order to attain the touched position detection with a high degree of accuracy.

Furthermore, the patent document 2 (hereinafter referred to as PD2) discloses an invention concerning the touch panel having a circular shape. More specifically, it describes the touch panel "facing an upper and a lower substrates with a constant gap apart in a manner deviating a upper standard conducting electrode twisted by 90 degrees with a lower standard conducting electrode, and bonded at the circumference of said substrates with an adhesive material, wherein said upper substrate comprises a upper transparent electrode formed underneath a flexible transparent substrate having a suborbicular shape, a standard conducting electrode having a straight line with a pre-determined length formed in the outer region on the same surface where the upper transparent conductive electrode is patterned, and a search conducting electrode arranged parallel to and having the same length with the standard conducting electrode, and said lower substrate comprises a lower transparent electrode formed on a suborbicular lower transparent substrate, a standard conducting electrode having a straight line with a pre-determined length formed in the outer region on the same surface where the lower transparent electrode is patterned, a plurality of search conducting electrodes arranged parallel to and having the same length with the standard conducting electrode, and the dot spacers formed on the upper surface of said lower transparent conductive electrode." Although PD2 discloses the method detecting the touched position by arranging a number of electrodes around the periphery, it is natural to attain high degree of accuracy with a method using many electrodes since the resolution of the position detection increases with the number of the electrodes utilized.

In addition, the patent document 3 (hereinafter referred to as PD3) discloses the input devices with sheet-like structures, which enables us to use input screens having circular or oval shapes. More specifically, it describes "The shapes of the upper and the lower resistance films placed oppositely with each other on the upper and the lower panels, respectively, are both circular. Leading lines are connected at the edges of the diametrical directions in X and Y-axes of the circular resistance film formed on the upper panel. By contrast, the lower panel film facing these circular resistance films and being contacted with them by thrust may be made of a resistance film or a conducting film. The size of the lower panel film is enough to encompass the upper resistance film. An edge of a lead line is connected to the lower film at an arbitrary position on its rim, and another edge is connected to the control circuit." The method to detect the touched position is disclosed to utilize these two pairs of electrode with the principle of Apollonius' circles.

PRIOR ART DOCUMENTS

Patent Documents

PD1: Japanese Laid-open Patent Publication No. 2005-128819
PD2: Japanese Laid-open Patent Publication No. 2005-182339
PD3: Japanese Laid-open Patent Publication No. H11-143622

SUMMARY OF THE INVENTION

Technical problem

The following problems concerning the diminution of the edge area (architrave) of the panel that does not contribute to the touch detection and the high accuracy touch detection at an arbitrary position exist in the resistive touch panel constructed with pasting circular or oval substrates forming a transparent conductive film on each substrate and facing them with each other with an adhesive material along their circumferences to allow a transparent conductive film to be touched.

PD1 discloses the position detection method utilizing the three electrodes and the look-up table in order to attain high accuracy. However, an enormous volume of data is needed since the resolution of the position detection relies on the number of the look-up table, which needs a large volume of memory. The method also has the problem that it is not flexible to the variation of the parts since the data used for the look-up table are built with the accumulation of the experimental data.

In addition, PD2 discloses the position detection method arranging many electrodes in the surrounding area of the touch panel. Although the high accuracy detection is attained by arranging many electrodes, the method has the problem that the architrave area increases since the resolution of the position detection relies on the number of the electrodes which result in the increase of the number of the outgoing wirings.

Further, PD3 discloses the position detection method utilizing two pairs of electrodes with the principle of Apollonius' circles. Although the method enables high accuracy position detection at around the center area, the detection accuracy decreases around the vicinity of the electrodes or the architrave area because of the distortion of the electric field. The portions with low detection accuracy are not able to be used as the detection area as a result. Therefore, the method has the problem that there exists a limit to decrease the architrave area.

The present invention aims to decrease the external form of a touch panel without impairing the detection accuracy of the touch input area, and to simplify the computational expression by detecting the electric voltage values inverting the polarity of the electric voltage applied to a pair of the electrodes in order to identify which quadrant of the touch input area is touched.

Solution to problem

In this context, the present invention intends to provide a touch panel using the principle of Apollonius' circle for the touched position detection, wherein said touch panel is fabricated in the manner that two substrates having a transparent conductive film thereon are placed so that said each transparent conductive film is facing each other, a first substrate has one electrode, a second substrate has a pair of point electrodes, said two pairs of point electrodes are arranged in a circumference region of said second substrate, a insulation layer is formed in said circumference region excluding the region where said two pairs of point electrodes are formed, and wirings extracting said two pairs of electrodes outwards are formed on said insulation layer and arranged in the region inner than said two pairs of point electrodes.

The touch panel provided by the present invention also comprises a calculation circuit computing the touched position, wherein said wirings of said first substrate are connected to a detection circuit and said wirings of said second substrate are connected to a scanning circuit.

Further, said calculation circuit has functions compensating the detection errors stemming from the aging variation of the resistances of said transparent films formed on said first and second substrates, and compensating the distortions of the electric fields at the edge of said transparent conductive films and in the vicinity of said electrodes.

In addition, said touch panel executes following procedures that said scanning circuit applies an electric voltage to a pair of electrodes formed on said second substrate and then applies the electric voltage again to said electrodes inverting the polarity, and the similar electric voltage application process is performed for the other pair of the electrodes.

Further, the touch panel of the present invention executes the touched position detection comprising consecutive processes of applying an electric voltage to said one pair of the electrodes formed on said second substrate, calculating the ratio of the distances with the distances from the touched position to one electrode and that of the other electrode by using the value of the detected electric voltage formed on said first substrate, calculating the trajectory by using the principle of Apollonius' circles satisfying the condition that said ratio of the distances keeps a constant value and the same processes for the other pair of the electrodes, and calculating the touched position as the intersection point of the two trajectories.

Next, said first and second substrates have their circular (or oval) shapes.

Simultaneously, said first and second substrates have their rectangular shapes and having two pairs of the point electrodes at the corners of said second substrate. Said touch panels may be mounted onto the display device.

Advantageous Effects of Invention

In accordance with one aspect of the present invention, there is an advantageous effect that the touch panel does not need a look-up table nor the memory for the look-up table to be stored therein.

In another aspect of the invention, the architrave area of the touch panel can be decreased because of the small size of the electrodes.

In a further aspect of the invention, downsizing the external form of the panel can be performed by utilizing the circumference area of the conductive film and the vicinity of the point electrode where the electric field is easily distorted as the areas for the wiring without impairing the detection accuracy of the touch input area.

BRIEF DESCRIPTION OF THE DRAWINGS

FIG. 5A is an illustrative drawing explaining the action of the scanning circuit of the touch panel provided with the embodiment 1 of the present invention.

FIG. 11A is an illustrative drawing explaining the action of the scanning circuit of the touch panel provided with the embodiment 2 of the present invention.

DETAILED DESCRIPTION OF THE INVENTION

Detailed Description of the Invention (Embodiment 1)

Figure 1:
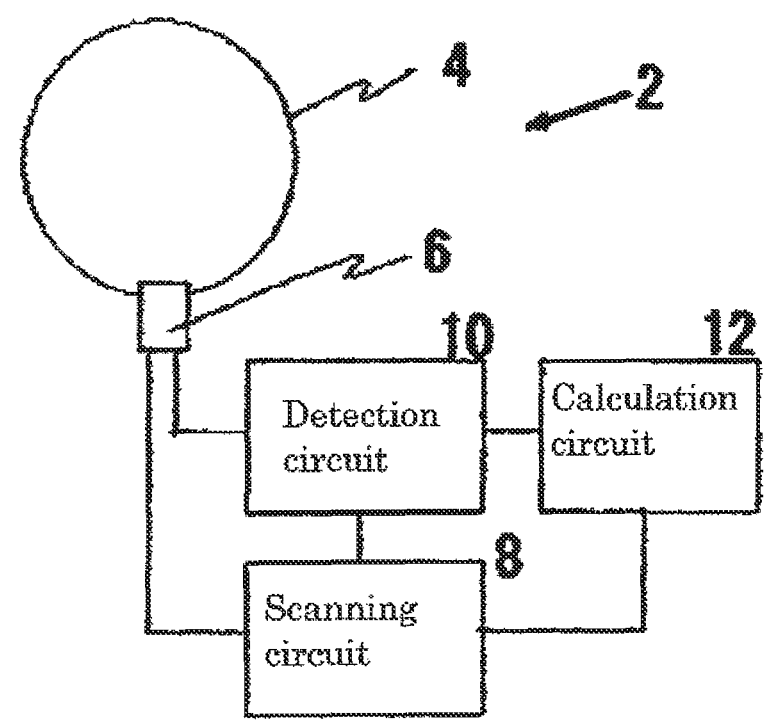
FIG. 1 illustrates a structural allover view of the touch panel provided with the embodiment 1 of the present invention.

FIG. 1 illustrates an overall block diagram of the embodiment 1 of the present invention.

The touch panel 2 of the present invention comprises a touch panel section 4, FPC6 (Flexible Printed Circuit) which provides electrical interconnection between the wirings of the touch panel and an external circuit, a scanning circuit 8 which applies the electric voltage to the electrodes of the touch panel, a detection circuit 10 which detects the electric voltage from the touch panel, and a calculation circuit 12 which computes the touched position from the detected electric voltage.

Figure 2:
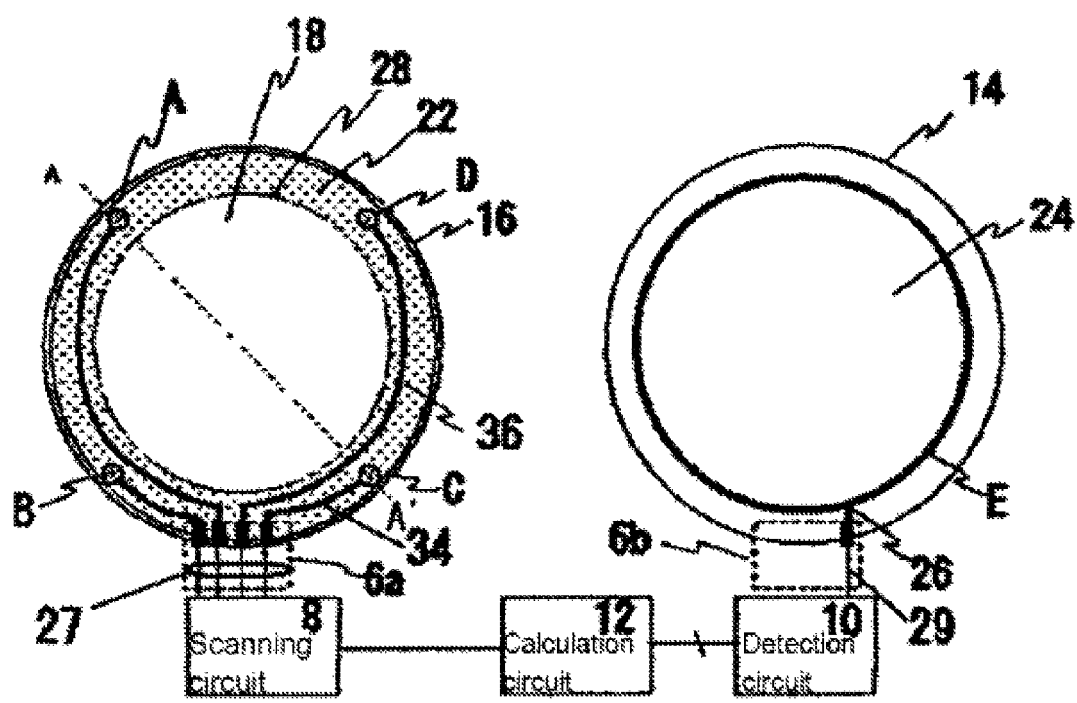
FIG. 2 illustrates a connection between the touch panel section and the detection section of the touch panel provided with the embodiment 1 of the present invention.

FIG. 2 shows the connection among the electrodes formed on the upper substrate 14 and the lower substrate 16 of the touch panel 4, the scanning circuit 8, and the detection circuit 10.

An upper substrate 14 has a circular shape, and a transparent conductive film 24 having a diameter smaller than that of the upper substrate 14 is mounted at the center thereon. Further, the electrode E is formed along the outer rim of the transparent conductive film 24. The electrode E is connected with the detection circuit 10 with the wiring 29 in FPC6b.

The lower substrate 16 also has a circular shape, and a transparent conductive film 18 having a diameter smaller than that of the upper substrate 14 is mounted at the center thereon and an insulation layer 22 is formed along the outer rim of the film. An insulation layer aperture 28 opens in a circular pattern at the center of the insulation layer 22. The electrodes A, B, C, and D are all located on the insulation layer 22 and corresponding other electrodes are all connected to the scanning circuit 8 with the wiring 27 in FPC6a.

The electrode A is arranged on the insulation layer 22 in the direction of 10 o'clock regarding the transparent conductive film 18 as watching the surface of the upper substrate 14 from above.

Whereas the electrode B is arranged on the insulation layer 22 in the direction of 8 o'clock regarding the transparent conductive film 18 as watching the surface of the upper substrate 14 from above.

Further, the electrode C is arranged on the insulation layer 22 in the direction of 4 o'clock regarding the transparent conductive film 18 as watching the surface of the upper substrate 14 from above. The electrode A and C are located at the point-symmetric positions regarding the transparent conductive film 18.

In addition, the electrode D is arranged on the insulation layer 22 in the direction of 2 o'clock regarding the transparent conductive film 18 as watching the surface of the upper substrate 14 from above. The electrode B and D are located at the point-symmetric positions regarding the transparent conductive film 18.

Figure 3A:
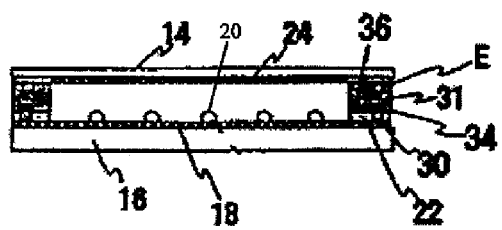
FIG. 3A illustrates a cross sectional view of the touch panel section of the touch panel provided with the embodiment 1 of the present invention.
Figure 3B:
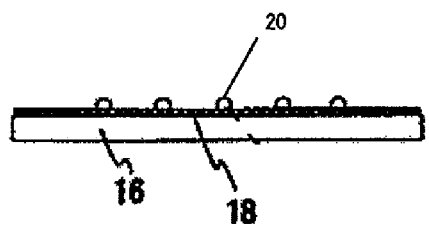
FIG. 3B illustrates a cross sectional view of the touch panel section of a touch panel provided with the embodiment 1 of the present invention.
Figure 3C:
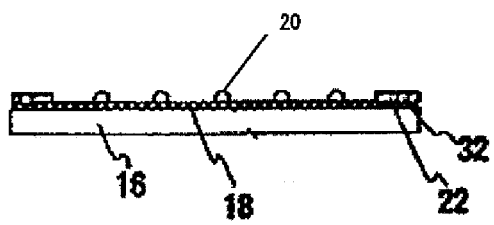
FIG. 3C illustrates a cross sectional view of the touch panel section of a touch panel provided with the embodiment 1 of the present invention.
Figure 3D:
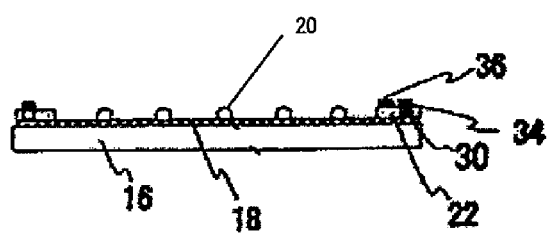
FIG. 3D illustrates a cross sectional view of the touch panel section of the touch panel provided with the embodiment 1 of the present invention.
Figure 4:
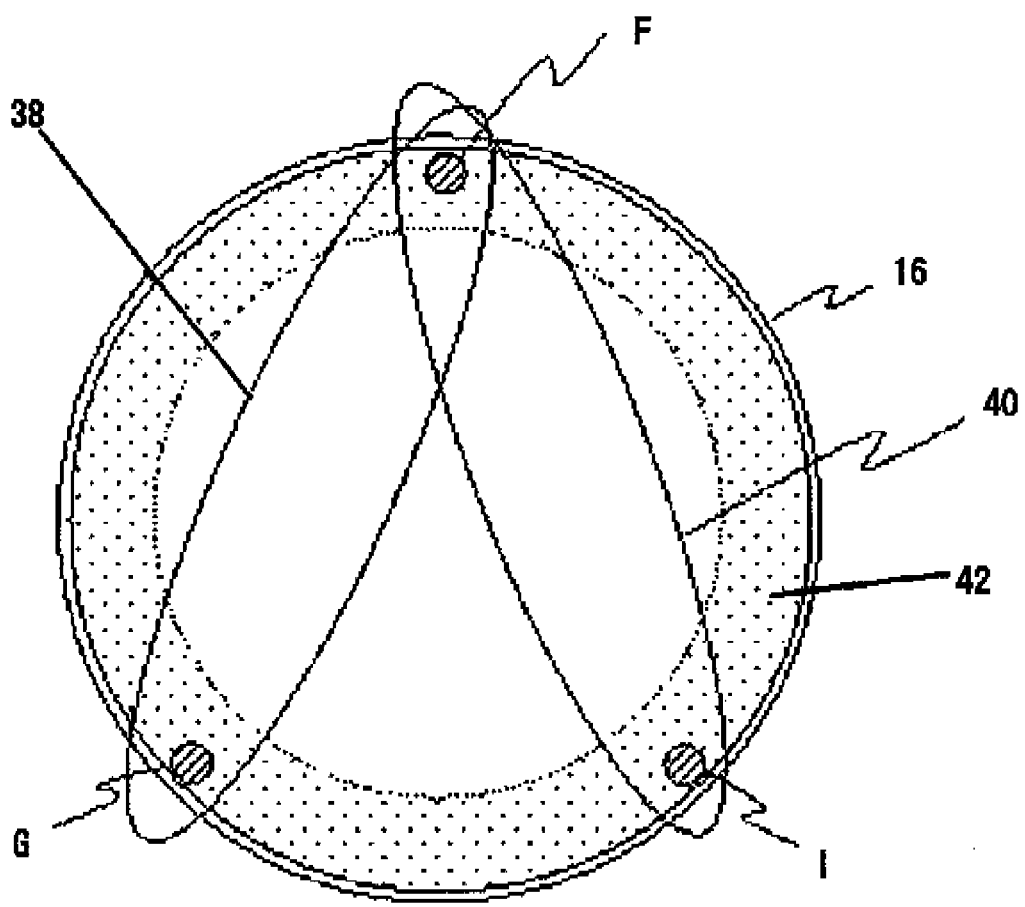
FIG. 4 illustrates a connection between the touch panel section and the detection section of the touch panel provided with the embodiment 1 of the present invention.

FIGS. 3A-3D show the cross sectional views and the fabrication flow diagram of the touch panel. FIG. 3A shows a cross sectional view taken along the line A-A' shown in FIG. 2. FIG. 3B and after are the flow diagrams illustrating fabrication steps of the lower substrate 16 viewing the cross section taken along the line A-A' shown in FIG. 2, wherein FIG. 3B shows a step forming the dot spacers 20 on the lower substrate 16. FIG. 3C shows a step forming the insulation layer 22 and the holes 32, wherein FIGS. 3B-3D shows the fabrication steps of the lower substrate 16 viewing the cross section taken along the line A-A' shown in FIG. 2. FIG. 3D illustrates the result forming the electrode 30 on the insulation layer 22, and arranging the wirings 34 and 36.

The lower substrate is prepared by forming the dot spacers 20 on the surface of the transparent conductive film deposited substrate (FIG. 3B).

Then, the organic insulation layer 22 is formed in the architrave region as a circumference of the substrate. At this time point-like holes 32 opens in the edge portion in order to form the point electrodes 30 and the transparent conductive film 18 reveals at the bottom of the holes (FIG. 3C).

The point electrodes and the wirings are formed by printing the conductive materials including the embedding of the holes 32. The wirings 36 extracted from the other point electrodes are arranged inside the region where the point electrodes 30 are formed when the wirings pass near the point electrodes 30 as well (FIG. 3D).

The touch panel section comprises the circular (or oval) lower substrate 16 having formed the transparent conductive film 18 thereon, the circular (or oval) upper substrate having formed the transparent conductive film 24 thereon arranged to have contacted with the opposing transparent conductive film 18 formed on the lower substrate 16, the electrodes to be electrically connected with the transparent conductive film 24, the wirings for extracting the electrodes to outside of the substrate, the insulation layer 22 insulating the electrodes from the wirings each other, the dot spacers 20 preventing miss-inputs occurring when touched, and the sealant pasting the upper and the lower substrates.

The electrodes A, B, C, and D used for applying the electric voltage to the transparent film 18 are arranged at the positions corresponding to the angles 0°, 90°, 180°, and 270° regarding the center of the circle (or oval) in the periphery of the substrate 16. The shape of the electrodes is preferably circular. The insulation layer is formed on the transparent conductive film excluding the electrode areas. The wirings formed on the insulation layer are connected with the electrodes A, B, C, and D, and extracted to the terminals formed in the peripheral region. The wirings may be located inside the point electrodes A, B, C, and D since the wirings are formed on the insulation layer.

FPC6*a* is connected to the terminal section and each of the wirings 27 extracted from the terminals is electrically connected with the scanning circuit 8.

The electrode E is formed along the outer periphery of the transparent conductive film 24. The wiring 26 is connected to the electrode E and extract the electrode to the outer terminal. FPC6*b* is connected to the terminal section and the wiring 29 extracted from the terminal is electrically connected with the detection circuit 10.

The detection circuit is connected with the calculation circuit. The calculation circuit is connected with the scanning circuit as well.

The calculation circuit 12 has the functions computing the touched position, compensating the resistance changes caused by the aging variation of the transparent conductive films 18 and 24 formed on the upper substrate 14 and the lower substrate 16, and compensating errors appearing in the position detection caused by the distortions of the electric fields at the edge portion of the transparent conductive film and the vicinity of the electrodes.

In addition, the three electrodes formed at arbitrary positions in the periphery of the lower substrate 42 are enough because the detection of the touched position can be performed as long as the electrodes F, G, and I, which configure the two different electrode combinations 38 and 40, are applied with an electric voltage.

However, the four-electrode configuration is used in order to simplify the handling in the following explanation of the present embodiment.

(Action of the Embodiment 1)

Actions of the scanning circuit 8, the detection circuit 10, and the calculation circuit 12 of the present invention are explained in the following. The scanning circuit applies the electric voltage to the electrodes A-D, depending on the situation.

Figure 5B:
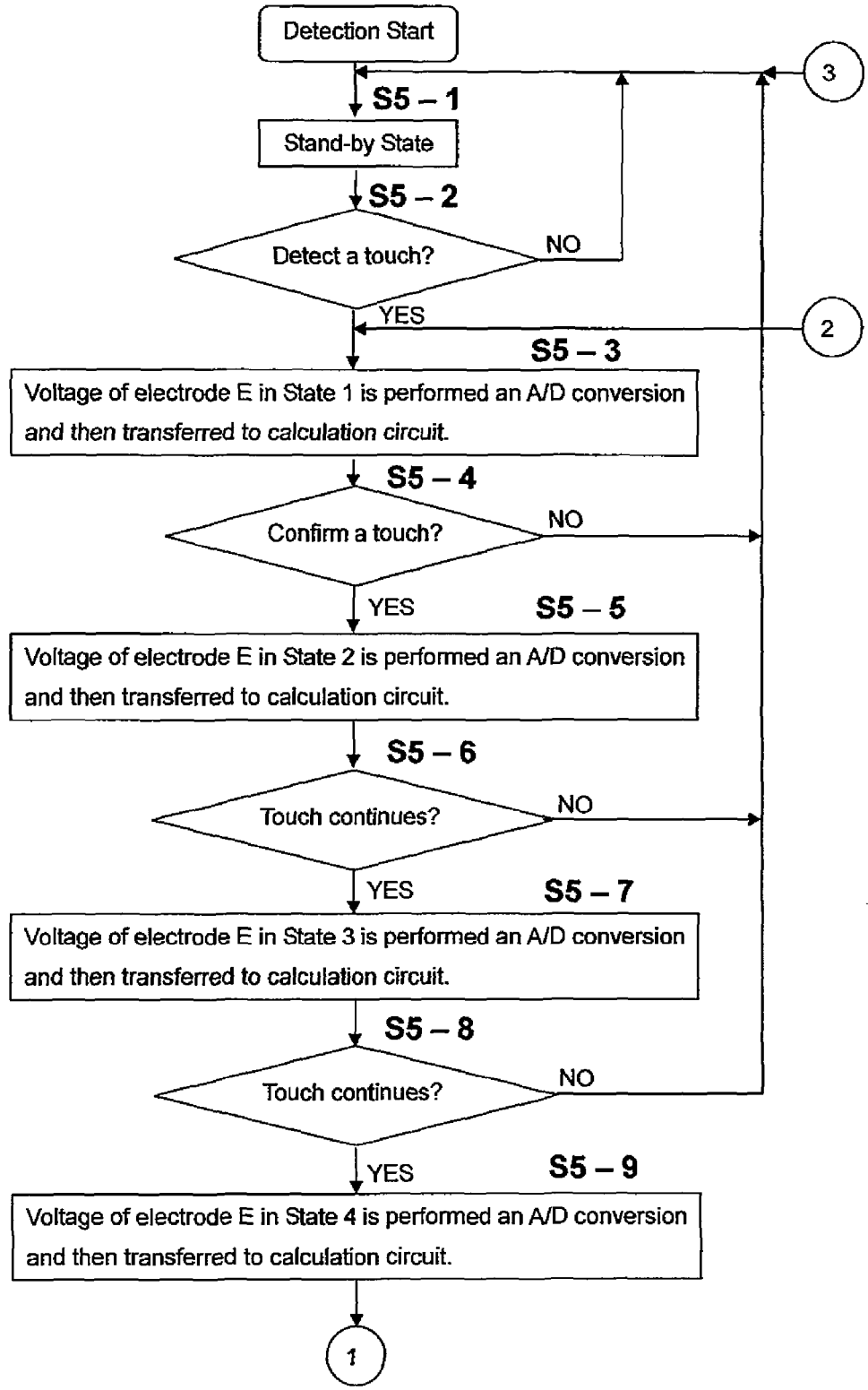
FIG. 5B is an illustrative drawing explaining the action of the scanning circuit of the touch panel provided with the embodiment 1 of the present invention.

FIGS. 5A and 5B show the state diagram and the flow chart of the scanning circuit of the embodiment 1 in a display device employing a touch panel provided by the present invention, respectively.

The touch panel stays in the standby state when the touch panel isn't touched (the untouched state). In the standby state, any one of the electrodes A-D is applied with the electric voltage VDD and the remaining other electrodes are in Hi-Z (high impedance) state.

Figure 6:
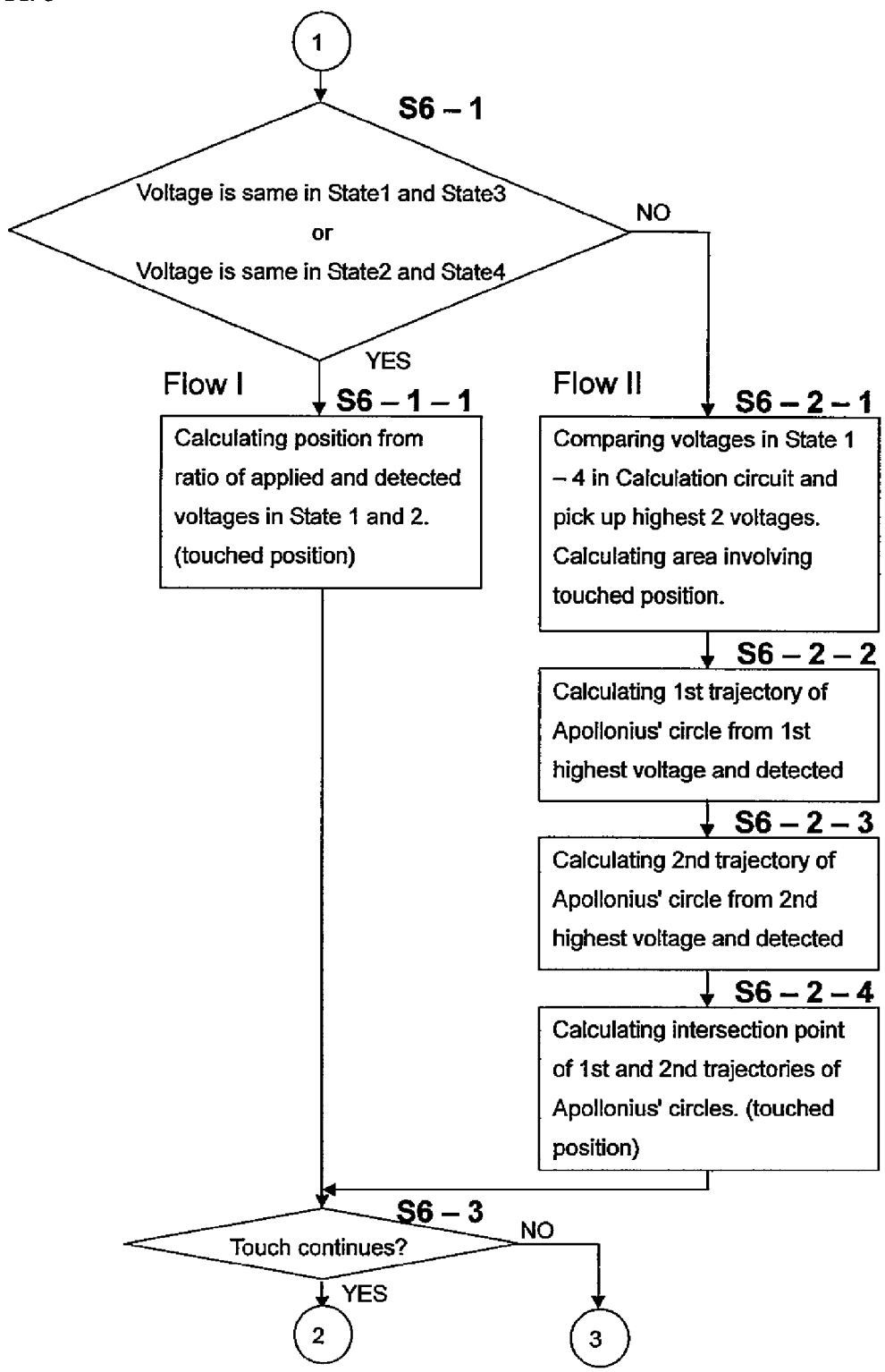
FIG. 6 shows a flow chart explaining the calculation procedures of the detected position in the touch panel provided with the embodiment 1 of the present invention.
Figure 7:
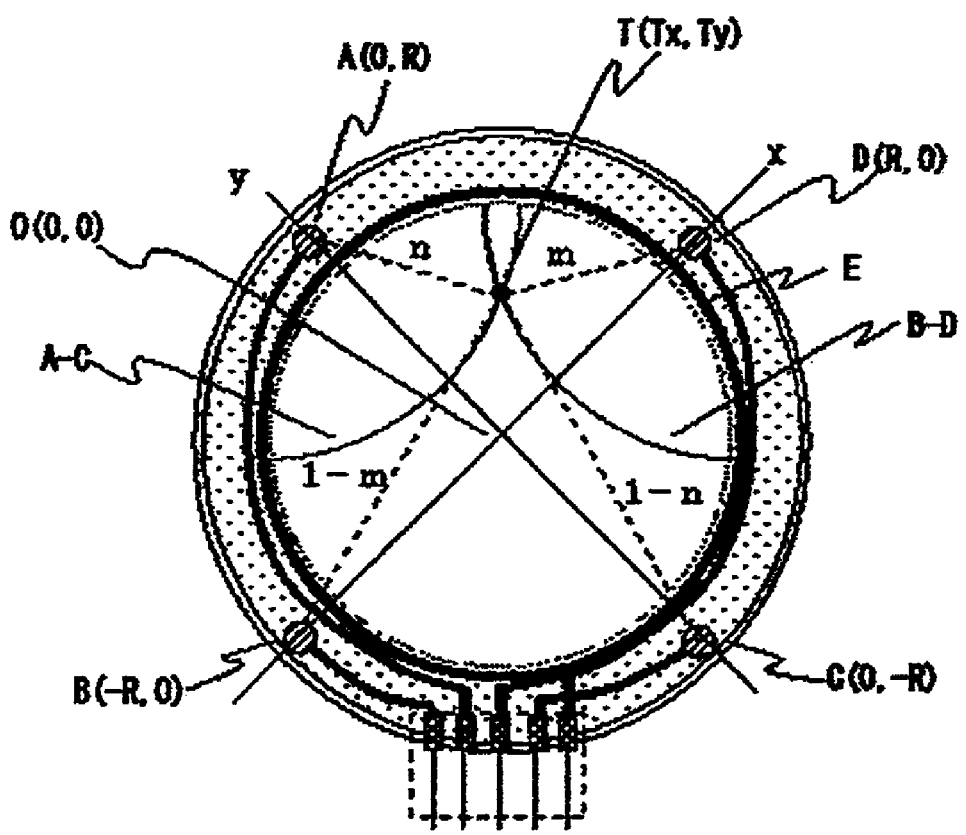
FIG. 7 is an illustrative drawing explaining the calculation method of the detected position in the touch panel provided with the embodiment 1 of the present invention.

FIG. 6 shows a flow chart illustrating the action of the scanning circuit 8 applied with the electric voltage VDD to the electrode A.

When the scanning circuit 8 detects a touch in the standby state, it performs the sequence of the electric voltage application for the state 1-4 shown in FIG. 5(*b*).

In the state 1, the electrode A is applied with the high side electric voltage VDD, and the electrode C is applied with the low side electric voltage GND.

In the state 2, the electrode B is applied with the high side electric voltage VDD, and the electrode D is applied with the low side electric voltage GND.

In the state 3, the electrode C is applied with the high side electric voltage VDD, and the electrode A is applied with the low side electric voltage GND.

In the state 4, the electrode D is applied with the high side electric voltage VDD, and the electrode B is applied with the low side electric voltage GND.

Said actions are repeated while the touched state continues. When the state turns to the untouched state, said actions are ceased and then the state is shifted to the stand-by state.

In addition, the calculation circuit 12 is transferred the information in which state the scanning circuit is.

The detection circuit 10 monitors the electric voltage of the electrode E. When the upper substrate of the touch panel is touched, the upper substrate 14 becomes bended and the transparent conductive film 24 of the upper substrate 14 and the transparent conductive film 18 of the lower substrate 16 are electrically connected. At this time a certain electric voltage arises at the electrode E and the touched condition is achieved. The electric voltage detected at the electrode E is performed an A/D conversion and then transferred to the calculation circuit 12.

The calculation circuit 12 computes the touched position using the condition of the applied electric voltage and the detected electric voltage and if need arises compensates the calculated value.

(Procedures of Example 1)

FIG. 6 shows a flow chart illustrating the procedures of the detection of a touch and the calculation of the touched position in the example 1 of the touch panel provided by the present invention.

At first the touch panel is kept at the stand-by state by the scanning circuit when the detection begins.

When the touch panel is touched, the touch panel shifts to the touched state, and the scanning circuit 8 sequentially shift its state from the state 1 to the state 4 as shown in FIG. 5(*a*), and then applies the electric voltage. At this time the electric voltage detected at the electrode E is performed an A/D conversion, and then the resulting data are transferred to the calculation circuit 12. The state is turned to the stand-by state when the state becomes untouched during the sequential actions from the state 1 to 4.

The touched position calculation action begins when the detected electric voltage of the state 4 is obtained.

At first the detected electric voltages of the state 1 and 3, also those of the state 2 and 4 are compared (S6-1), respectively. If the electric voltages are found to have the same value in either of the comparisons, the touched position is determined with the flow (1) (S6-1-1) since the touched position lies on either of the two lines connecting the electrodes A and C or B and D.

For example, when the state 1 and 3 have the same detected electric voltage value, the touched position lies at the position where the ratios of the distances from the touched position to the electrodes A and C is equal, namely, the touched position lies on the line connecting the electrodes B and D. The coordination of the touched position (Tx, Ty) is calculated from the values of the applied electric voltage and the detected electric voltage in the state 2. Since the detected electric voltage Vbd is the electric voltage obtained by dividing the electric voltage between the electrodes B and D regarding the touched position, it is deduced that Tx=(VDD−GND)/2−Vbd/(VDD−GND) and Ty becomes 0 as Ty lies on the line connecting the electrodes B and D when the center coordinate of the touch panel is assumed as (0, 0).

On the other hand, if it is found that neither of the two comparisons of the detected electric voltage values between the state 1 and 3 or the state 2 and 4 have the same electric voltage value, the touched position is calculated with the flow (2) (S6-2-1).

At first the comparisons of the detected electric voltage values from the state 1 to 4 are performed, and then the states having the highest two detected electric voltages are extracted (S6-2-2). The touched position lies in the region defined by the electrode applied with the first highest electric voltage value, the electrode applied with the second highest electric voltage value, and the center of the circle (or oval).

For example, if the touched position T (Tx, Ty) lies in the region defined by the center of the touch panel, and the electrodes A and D, the ratio of the two distances from the touched position T to the two electrodes A and C, n: 1−n (0<n<1), can be calculated with the detected electric voltage VT1 when the electric voltages VDD and the GND are applied to the electrode A and the electrode C, respectively, $$n=1-VT1/VDD \quad \text{(eq. 1)}$$

as described above.

Similarly, the ratio of the two distances from the touched position T to the two electrodes D and B, m: 1−m(0<m<1), is calculated with the detected electric voltage VT2 when the electric voltages VDD and the GND are applied to the electrode D and the electrode B, respectively, $$m=1-VT2/VDD \quad \text{(eq. 2)}$$

as described above.

Since the touched position T is involved in an Apollonius' circle having a feature that the ratio of the distances from the touched position to the two electrodes A and C keeps a constant value of n: 1−n and is simultaneously involved in another Apollonius' circle having a feature that the ratio of the distances from the touched position to the two electrodes D and B keeps a constant value of m: 1−m, the touched position T can be calculated as the intersection point of the two circles. When the center of the circle is set at the origin (0, 0), the coordinates of the electrodes A, B, C, and D are set as (0, R), (−R, 0), (0, −R), and (R, 0), respectively, the touched position T (Tx, Ty) lies in the first quadrant and its coordinate is expressed as follows (S6-2-2):

$$Tx=\{R\cdot N-R\cdot(N^2-M)^{1/2}\}/M \quad \text{(eq. 3)}$$

$$Ty=\{R\cdot N'-R\cdot(N'^2-M')^{1/2}\}/M' \quad \text{(eq. 4)}$$

Here, $$R=VDD/2 \quad \text{(eq. 5)}$$

$$M=1+a^2\cdot d^2/c^2/b^2 \quad \text{(eq. 6)}$$

$$N=d/c \quad \text{(eq. 7)}$$

$$M'=1+b^2\cdot c^2/a^2/d^2 \quad \text{(eq. 8)}$$

$$N'=b/a \quad \text{(eq. 9)}$$

$$a=1-2\cdot n, \ b=1-2\cdot n+2\cdot n^2 \quad \text{(eq. 10)}$$

$$c=1-2\cdot m \ d=1-2\cdot m+2\cdot m^2 \quad \text{(eq. 11)}$$

Similarly, when the touched position lies in each of the second, the third, and the fourth quadrant, the coordinate becomes as follows:

When the touched position lies in the second quadrant, $$Tx=\{R\cdot N+R\cdot(N^2-M)^{1/2}\}/M \quad \text{(eq. 12)}$$

$$Ty=\{R\cdot N'-R\cdot(N'^2-M')^{1/2}\}/M' \quad \text{(eq. 13)}$$

When the touched position lies in the third quadrant, $$Tx=\{R\cdot N+R\cdot(N^2-M)^{1/2}\}/M \quad \text{(eq. 14)}$$

$$Ty=\{R\cdot N'+R\cdot(N'^2-M')^{1/2}\}/M' \quad \text{(eq. 15)}$$

When the touched position lies in the fourth quadrant, $$Tx=\{R\cdot N-R\cdot(N^2-M)^{1/2}\}/M \quad \text{(eq. 16)}$$

$$Ty=\{R\cdot N'+R\cdot(N'^2-M')^{1/2}\}/M' \quad \text{(eq. 17)}$$

After calculation, the sequential actions from the state 1 to 4 are repeated by the scanning circuit when the touch panel stays in the touched state. The state shifts to the stand-by state when the touch panel becomes the untouched state.

(Explanation of the Effect of the Example 1)

Since the touched position is measured by using the intersection point of the Apollonius' circles, the detection of the touched position can be performed with the shape of the touch panel other than rectangular without referring a look-up table.

The computational expression of the touched position detection becomes simple by identifying the quadrant of the touched position with the comparison of the detected two electric voltages obtained by inverting the polarity of the applied electric voltage.

Although the electric fields have an tendency to be deformed in the vicinity of the electrodes and the circumstances of the conductive films, these ineffective regions affecting the detection accuracy of the touched position may be used as the architrave area for wiring by arranging the point electrodes used for applying the electric voltage in the circumference region as depositing a isolation layer 22 excepting the electrode areas and forming the wirings on the insulation layer 22.

The arrangement of the wirings does not need a large architrave area because the wirings of four in the lower substrate and one in the upper substrate are enough.

Since the electric potential necessary for the position detection can be formed with only the electrodes on the lower substrate 16, the position detection can be performed even if the transparent conductive film 24 of the upper substrate is damaged.

(Example 2)

Figure 8:
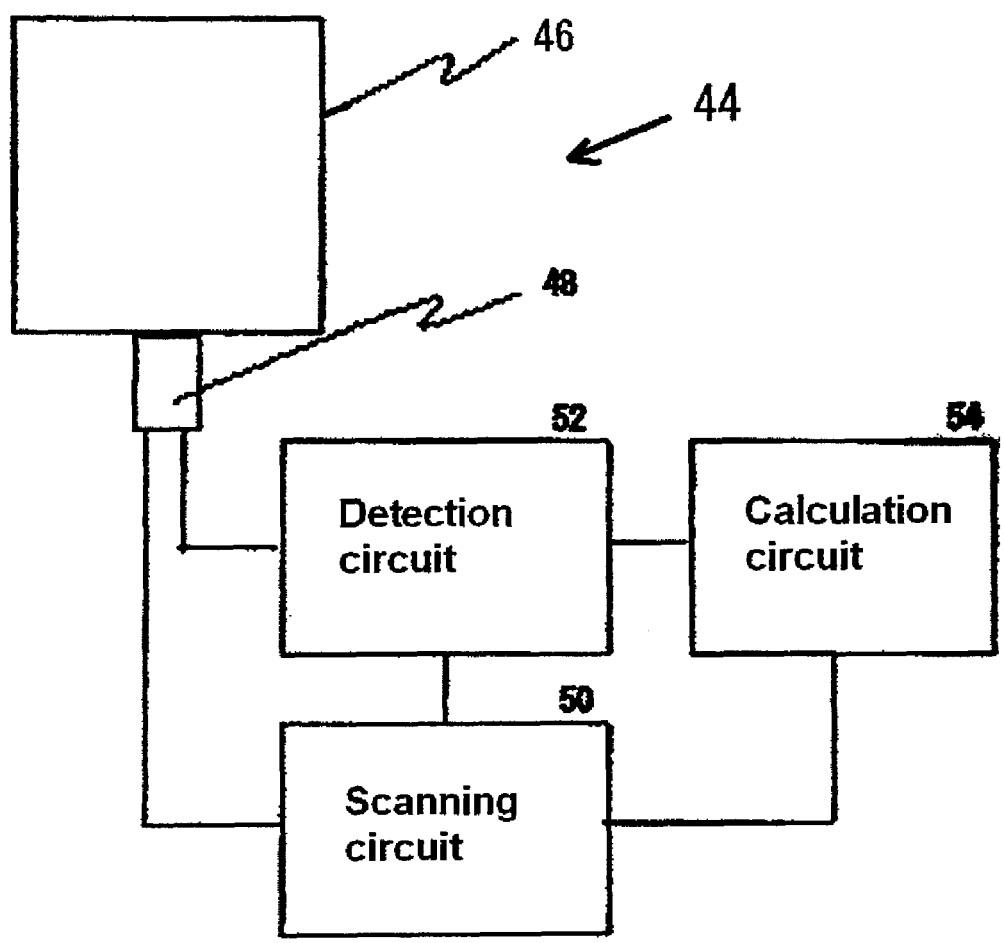
FIG. 8 illustrates a structural allover view of the touch panel provided with the embodiment 2 of the present invention.

FIG. 8 shows the overall view of the example 2 of the display device employing the touch panel provided by the present invention. The touch panel 44 of the present invention comprises the touch panel section 46, FPC48 used for electrically connecting the wirings of the touch panel with the external circuit, the scanning circuit 50 used for applying the electric voltage to the electrodes of the touch panel, the detection circuit 52 used for detecting the electric voltage from the touch panel, and the calculation circuit 54 used for calculating the touched position with the detected electric voltage.

Figure 9:
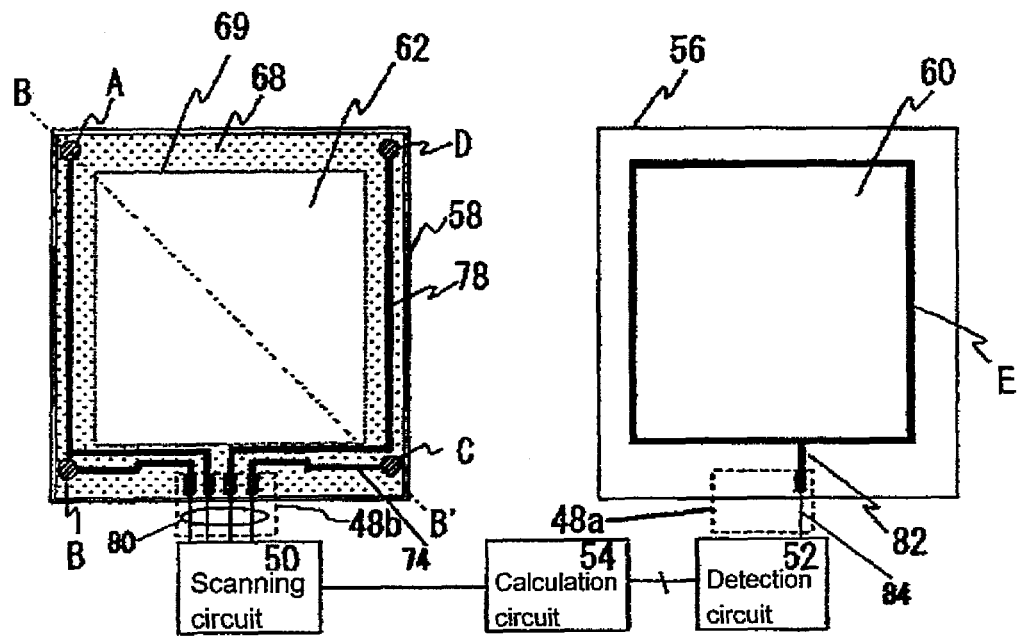
FIG. 9 illustrates a connection between the touch panel section and the detection section of the touch panel provided with the embodiment 2 of the present invention.

FIG. 9 illustrates the connection among the upper substrate 56 of the touch panel section and the electrodes of the lower substrate 58, the scanning circuit 50, and the detection circuit 52.

Figure 10A:
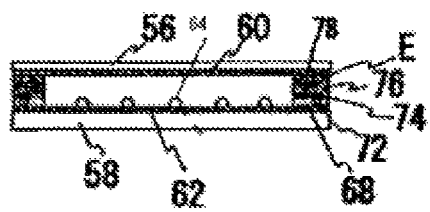
FIG. 10A illustrates a cross sectional view of the touch panel section of the touch panel provided with the embodiment 2 of the present invention.
Figure 10B:
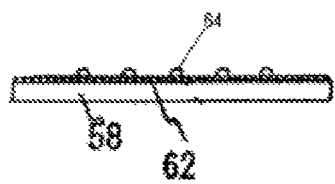
FIG. 10B illustrates a cross sectional view of the touch panel section of a touch panel provided with the embodiment 2 of the present invention.

FIG. 10A shows a cross-sectional view of the touch panel. Here, FIGS. 10B-10D show the fabrication process of the lower substrate 58 at the section B-B'.

Figure 10C:
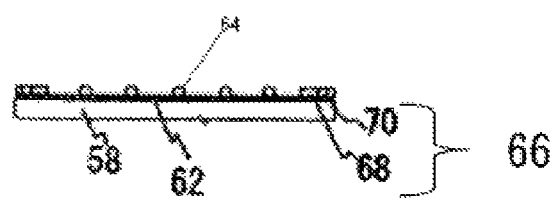
FIG. 10C illustrates a cross sectional view of the touch panel section of a touch panel provided with the embodiment 2 of the present invention.
Figure 10D:
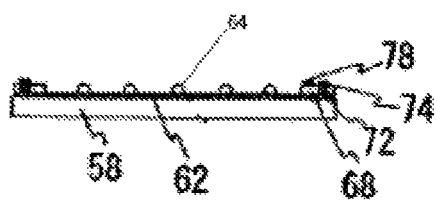
FIG. 10D illustrates a cross sectional view of the touch panel section of a touch panel provided with the embodiment 2 of the present invention.

The dot spacers 64 are formed onto the lower substrate deposited with the transparent conductive film 62 thereon (FIG. 10C).

Then, the organic insulation layer 68 is formed on the architrave region 66 of the substrate. At this time the point-like holes 70 exist in the edge portion of the organic insulation layer 68 in order to form the point electrodes and the transparent conductive film 62 reveals through the holes. The dot spacers are formed in the organic insulation layer opening 69 positioned at the center of the organic insulation layer 68.

The point electrodes and the wirings including the embedding of the holes 70 are formed by printing the conductive materials. In addition, when the wirings 78 extracted from other point electrodes lie in the vicinity of the point electrodes 72, those wirings are arranged inner than the point electrodes 72 (FIG. 10D).

The touch panel section 46 comprises the lower substrate 58 formed the transparent conductive film 62 thereon, the upper substrate 56 similarly formed the transparent conductive film 60 thereon and arranged to face with the transparent conductive film 62 of the lower substrate 58 in order to make contact with each other, the electrodes 27 used for making electrical contact with the transparent conductive film 60, the wirings 74 used for extracting the electrodes 72 outwards, the insulation layer 68 used for insulating the electrodes 72 and the wirings 74, the dot spacers 64 used for preventing the incorrect-inputs at touching, and the adhesive material 76 used for pasting the upper substrate 56 and the lower substrate 58 together with.

On the lower substrate, the electrodes A, B, C, and D in order to apply electric voltage to the transparent conductive film 62 are formed at the corners of the rectangular shape in the circumference region. The shape of the electrodes is preferably circular. The insulation layer 68 is formed on the transparent conductive film 62 excepting the region where the electrodes are formed. The wirings formed on the insulation layer 68 are connected with the electrode A, B, C, and D and extracts those electrodes to the terminals formed in the outer circumference.

The wirings may be formed in the region inner than the point electrodes A, B, C, and D are formed since the lead lines are formed on the insulation layer.

FPC48b is connected to the terminal and each of the wirings 80 extracted from the terminals is electrically connected to the scanning circuit 50.

On the upper substrate, the electrode E is formed in the circumference of the transparent conductive film 60. The wirings 82 are connected to the electrode E and are extracted to the terminals formed in the circumference. FPC48a is connected to the terminal and each of the wirings 84 extracted from the terminals is electrically connected to the detection circuit 52.

The detection circuit 42 is connected with the calculation circuit 54. And the calculation circuit 54 is connected with the scanning circuit 50.

The calculation circuit 54 has functions, other than calculating the touched position, compensating the aging variations of the resistance values caused in the transparent conductive films 60 and 62 of the upper substrate 56 and the lower substrate 58, respectively, and compensating the detection errors caused by the distortions of the electric fields at the circumference of the transparent conductive film and in the vicinity of the electrodes.

(Action of the Embodiment 2)

The actions of the scanning circuit 50, the detection circuit 52 and the calculation circuit 54 of the present invention are explained below.

The scanning circuit 50 applies the electric voltages to the electrodes A-D as needed.

Figure 11B:
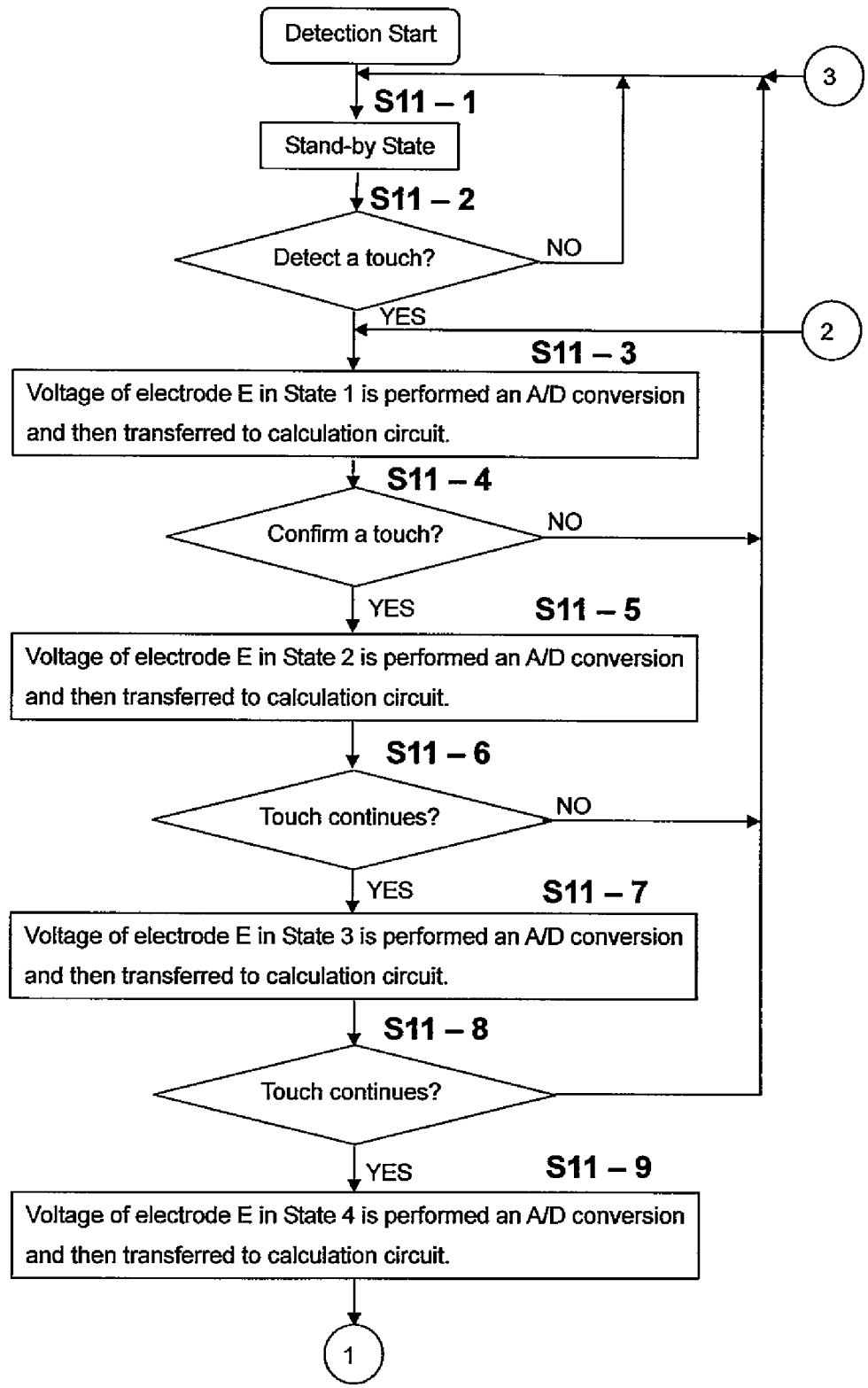
FIG. 11B is an illustrative drawing explaining the action of the scanning circuit of the touch panel provided with the embodiment 2 of the present invention.

FIG. 11 comprises the state diagram of the scanning circuit of the present invention as shown in FIG. 11A and the flow chart of the scanning circuit of the display device employing the touch panel provided as the example 2 of the present invention as shown in FIG. 11B.

While the touch panel is not touched (the untouched state), it keeps the stand-by state. In the stand-by state, one of the electrodes A-D is applied with the electric voltage VDD and remaining electrodes are kept at Hi-Z. FIG. 11D shows an example that the electrode A is applied with the electric voltage VDD. When a touch is detected (the touched state) in the stand-by state, the scanning circuit performs the sequential application of the electric voltages for the state 1-4.

At the state 1, the electrode A is applied with the high-side electric voltage of VDD and the electrode C is applied with the low-side electric voltage of GND.

At the state 2, the electrode B is applied with the high-side electric voltage of VDD and the electrode D is applied with the low-side electric voltage of GND.

At the state 3, the electrode C is applied with the high-side electric voltage of VDD and the electrode A is applied with the low-side electric voltage of GND.

At the state 4, the electrode D is applied with the high-side electric voltage of VDD and the electrode B is applied with the low-side electric voltage of GND.

The above mentioned actions are performed repeatedly while the touched state continues. When the state turns to the untouched state, these actions are ceased and the state is shifted to the stand-by state. The calculation circuit 54 is transferred the information concerning the state the scanning circuit is in.

The detection circuit 52 monitors the electric voltage of the electrode E. When the upper substrate 56 of the touch panel is touched, the upper substrate 56 becomes bended and the transparent conductive film 60 of the upper substrate 56 and the transparent conductive film 60 of the lower substrate 58 are electrically connected. At this time a certain electric voltage arises at the electrode E and the touched condition is achieved. The electric voltage detected at the electrode E is performed an A/D conversion, and then is transferred to the calculation circuit 54.

The calculation circuit 54 computes the touched position using the condition of the applied electric voltage and the detected electric voltage and if need arises compensates the calculated value.

(Procedures of Example 2)

Figure 12:
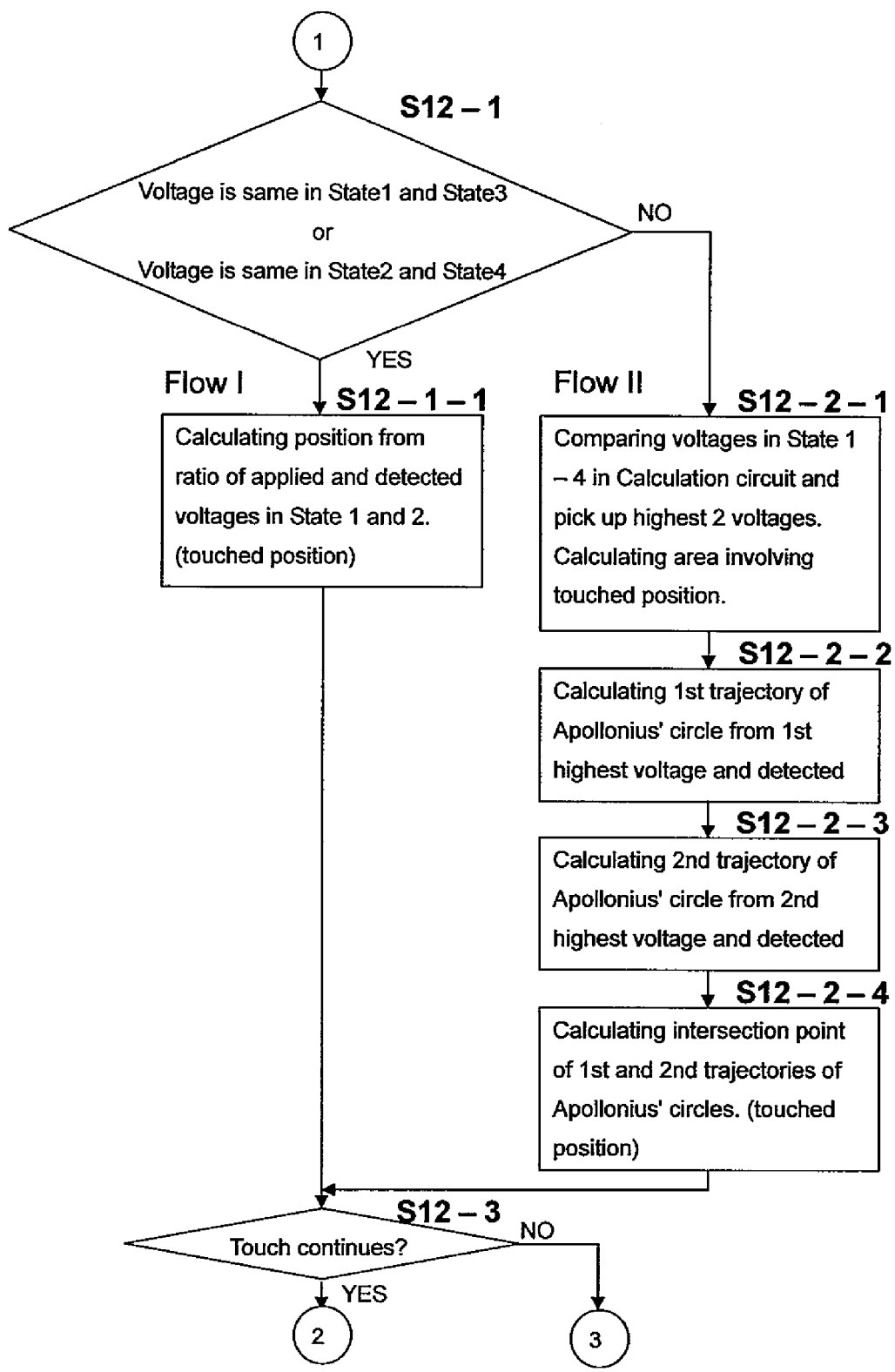
FIG. 12 shows a flow chart explaining the calculation procedures of the detected position in the touch panel provided with the embodiment 2 of the present invention.
Figure 13:
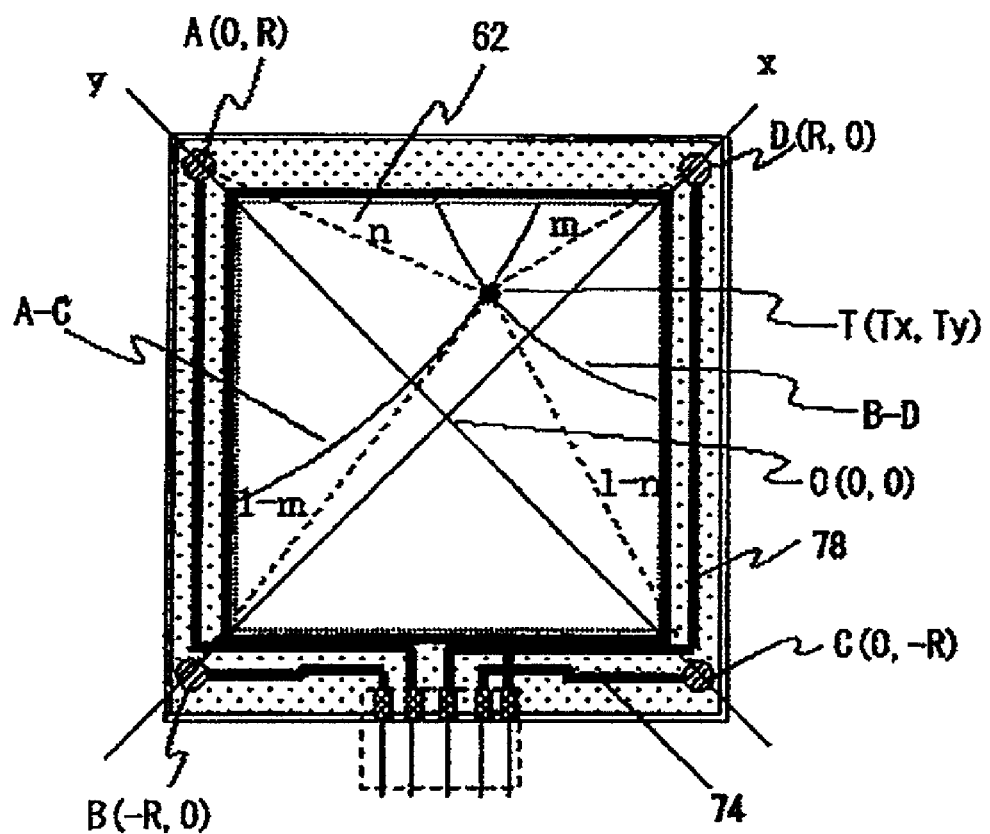
FIG. 13 is an illustrative drawing explaining the calculation method of the detected position in the touch panel provided with the embodiment 2 of the present invention.

FIG. 12 shows a flow chart illustrating the procedures of detecting a touch and the calculation of the touched position in the example 2 of the touch panel provided by the present invention.

At first the touch panel is kept at the stand-by state by the scanning circuit 50 when the detection begins.

When the touch panel is touched, the touch panel shifts to the touched state, and the scanning circuit 50 sequentially shifts its state from the state 1 to the state 4 and applies the electric voltages. At this time the electric voltage detected at the electrode E is performed an A/D conversion, and then the resulting data are transferred to the calculation circuit. The state is turned to the stand-by state when the state becomes untouched during the sequential action from the state 1 to 4. The touched position calculation action begins when the detection voltage at the state 4 is obtained.

At first the detected electric voltages of the state 1 and 3, also those of the state 2 and 4 are compared (S12–1), respectively. If the electric voltages are found to have the same value in either of the comparisons, the touched position is determined with the flow (1) (S12–1–1) since the touched position lies on either of the two lines connecting the electrodes A and C or B and D.

For example, when the state 1 and 3 have the same detected electric voltage value, the touched position lies at the position where the ratios of the distances from the touched position to the electrodes A and C is equal, namely, the touched position lies on the line connecting the electrodes B and D. The coordination of the touched position ($T_x$, $T_y$) is calculated from the values of the applied electric voltage and the detected electric voltage in the state 2. Since the detected electric voltage Vbd is the electric voltage obtained by dividing the electric voltage between the electrodes B–D regarding the touched position, it is deduced that Tx=(VDD–GND)/2–Vbd/(VDD–GND) and Ty becomes 0 as it lies on the line connecting the electrodes B and D when the center coordinate of the touch panel is assumed as (0, 0).

On the other hand, if it is found that neither of the two comparisons of the detected electric voltage values between the state 1 and 3 or the state 2 and 4 have the same electric voltage value, the touched position is calculated with the flow (2) (S12–2–1).

At first the comparisons of the detected electric voltage values from the state 1 to 4 re performed, and then the states having the highest two detected electric voltages are extracted (S12–2–2).The touched position lies in the region defined by the electrode applied with the first highest electric voltage value, the electrode applied with the second highest electric voltage value, and the center of the touch panel.

For example, if the touched position T (Tx, Ty) lies in the region defined by the center of the touch panel, and the electrodes A and D, the ratio of the two distances from the touched position T to the two electrodes A and D, n: 1–n (0<n<1), can be calculated with the detected electric voltage VT1 when the electric voltages VDD and the GND are applied to the electrode A and the electrode C, respectively, $$n=1-VT1/VDD \qquad (eq. 18)$$

as described above.

Similarly, the ratio of the two distances from the touched position T to the two electrodes D and B, m: 1–m(0<m<1), is calculated with the detected electric voltage VT2 when the electric voltages VDD and the GND are applied to the electrode D and the electrode B, respectively, $$m=1-VT2/VDD \qquad (eq. 19)$$

as described above.

Since the touched position T is involved in an Apollonius' circle having a feature that the ratio of the distances from the touched position to the two electrodes A and C keeps a constant value of n: 1–n and is simultaneously involved in another Apollonius' circle having a feature that the ratio of the distances from the touched position to the two electrodes D and B keeps a constant value of m: 1–m, the touched position T can be calculated as the intersection point of the two circles. When the center of the circle is set at the origin (0, 0), the coordinates of the electrodes A, B, C, and D are set as (0, R), (–R, 0), (0, –R), and (R, 0), respectively, the touched position T (Tx, Ty) lies in the first quadrant and its coordinate is expressed as follows (S12 –2 –2):

$$Tx=\{R\cdot N-R\cdot(N^2-M)^{1/2}\}/M \qquad (eq. 20)$$

$$Ty=\{R\cdot N'-R\cdot(N'^2-M')^{1/2}\}/M' \qquad (eq. 21)$$

Here, $$R=VDD/2 \qquad (eq. 22)$$

$$M=1+a^2\cdot d^2/c^2/b^2 \qquad (eq. 23)$$

$$N=d/c \qquad (eq. 24)$$

$$M'=1+b^2\cdot c^2/a^2/d^2 \qquad (eq. 25)$$

$$N'=b/a \qquad (eq. 26)$$

$$a=1-2\cdot n,\ b=1-2\cdot n+2-n^2 \qquad (eq. 27)$$

$$c=1-2\cdot m\ d=1-2\cdot m-2\cdot m^2 \qquad (eq. 28)$$

Similarly, when the touched position lies in each of the second, the third, and the fourth quadrant, the coordinate becomes as follow:

When the touched position lies in the second quadrant, $$Tx=\{R\cdot N+R\cdot(N^2-M)^{1/2}\}/M \qquad (eq. 29)$$

$$Ty=\{R\cdot N'-R\cdot(N'^2-M')^{1/2}\}/M' \qquad (eq. 30)$$

When the touched position lies in the third quadrant, $$Tx=\{R\cdot N+R\cdot(N^2-M)^{1/2}\}/M \qquad (eq. 31)$$

$$Ty=\{R\cdot N'+R\cdot(N'^2-M')^{1/2}\}/M' \qquad (eq. 32)$$

When the touched position lies in the fourth quadrant, $$Tx=\{R\cdot N-R\cdot(N^2-M)^{1/2}\}/M \qquad (eq. 33)$$

$$Ty=\{R\cdot N'+R\cdot(N'^2-M')^{1/2}\}M' \qquad (eq. 34)$$

After calculation, the sequential actions from the state 1 to 4 are repeated by the scanning circuit while the touch panel is in the touched state. The state shifts to the stand-by state when the touch panel becomes the untouched state (S12–2–3)–(S12–2–4).

(Explanation of the Effect of the Example 2)

Since the touched position is measured by using the intersection point of the Apollonius' circles, it is not necessary to form a long electrode along the side.

The computational expression of the touched position detection becomes simple by identifying the quadrant of the touched position with the comparison of the detected two electric voltages obtained by inverting the polarity of the applied electric voltage.

Although the electric fields have an tendency to be deformed in the vicinity of the electrodes and the circumstances of the conductive films, these ineffective regions affecting the detection accuracy of the touched position may be used as the architrave area for wiring by arranging the point electrodes applying the electric voltage in the circumference region as depositing a isolation layer excepting the electrode areas and forming the wirings on the insulation layer.

The arrangement of the wirings does not need a large architrave area because the wirings of four in the lower substrate 58 and one in the upper substrate 56 are enough.

Since the electric potential necessary for the position detection can be formed with only the electrodes on the lower substrate 58, the position detection can be performed even if the transparent conductive film 60 of the upper substrate 56 is damaged.

Figure 14:
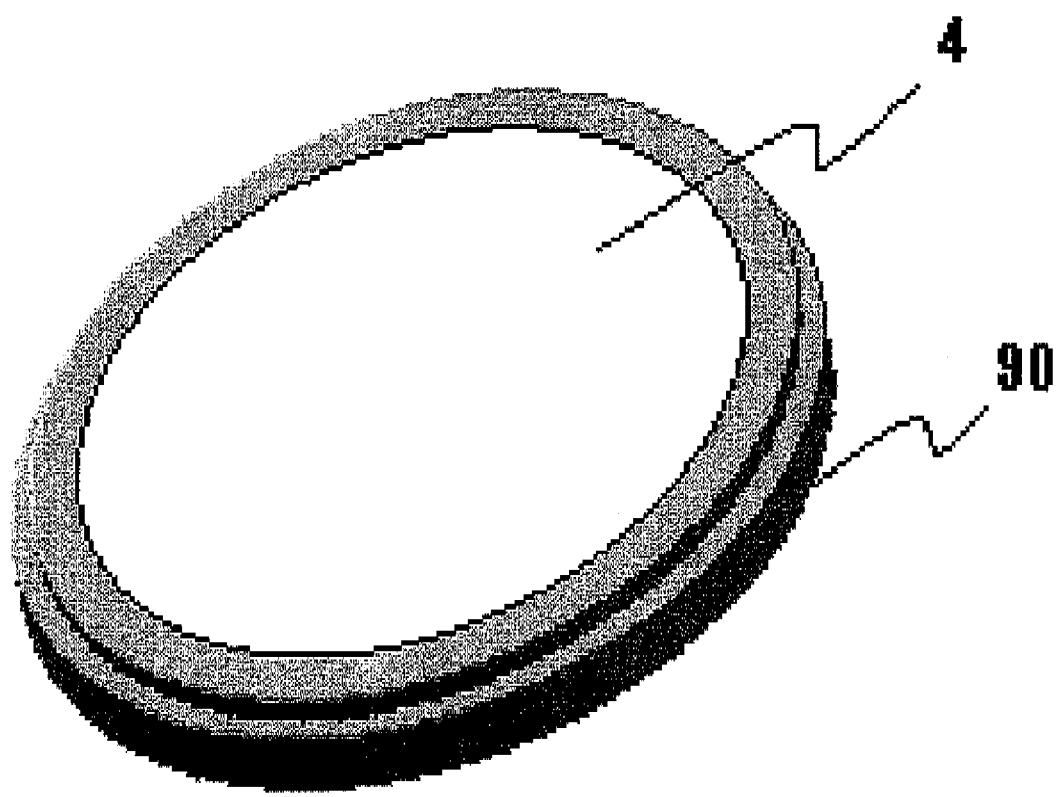
FIG. 14 illustrates a display device employing the touch panel of the present invention.
Figure 15:
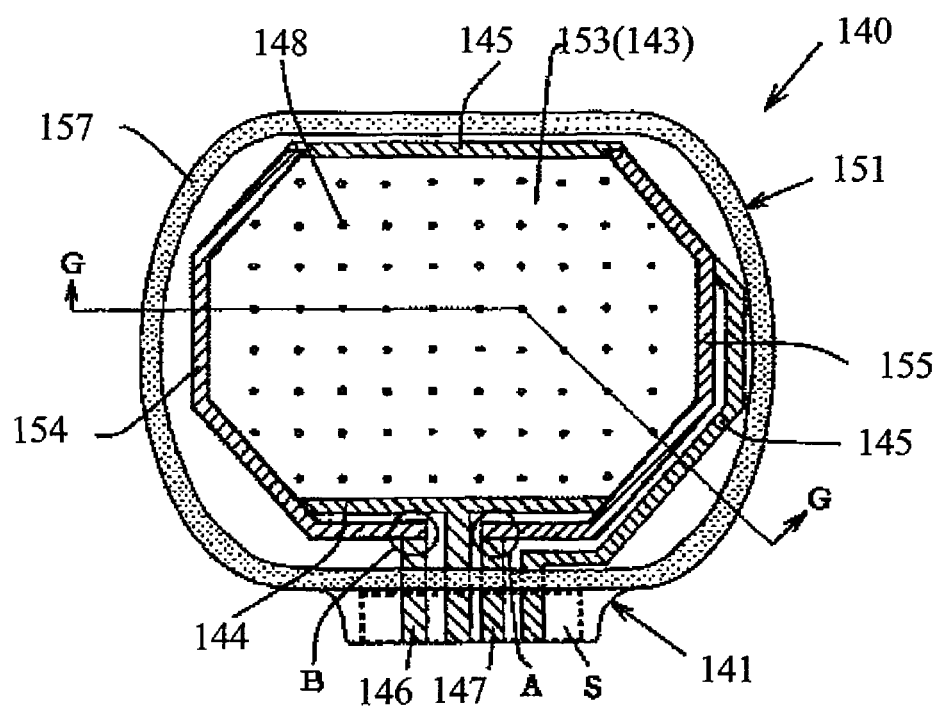
FIG. 15 illustrates a typical touch panel provided with PD1 as the prior art.
Figure 16:
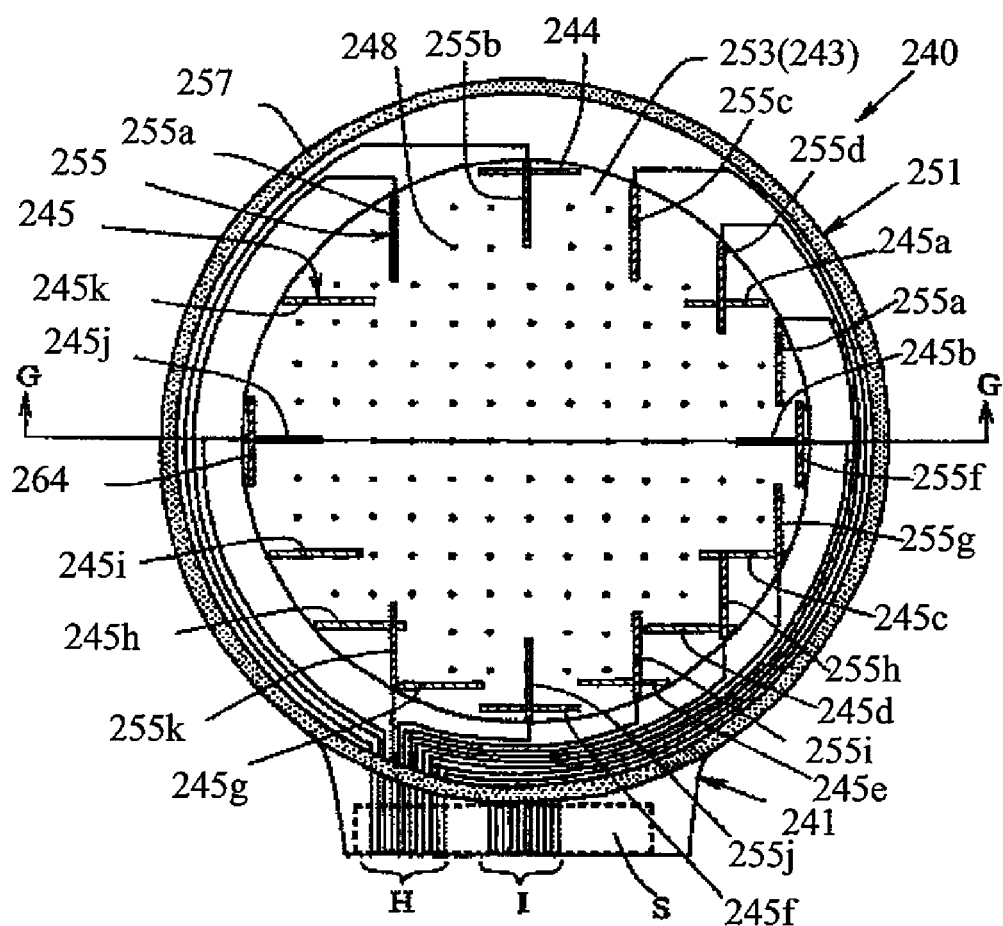
FIG. 16 illustrates a typical touch panel provided with PD2 as the prior art.
Figure 17:
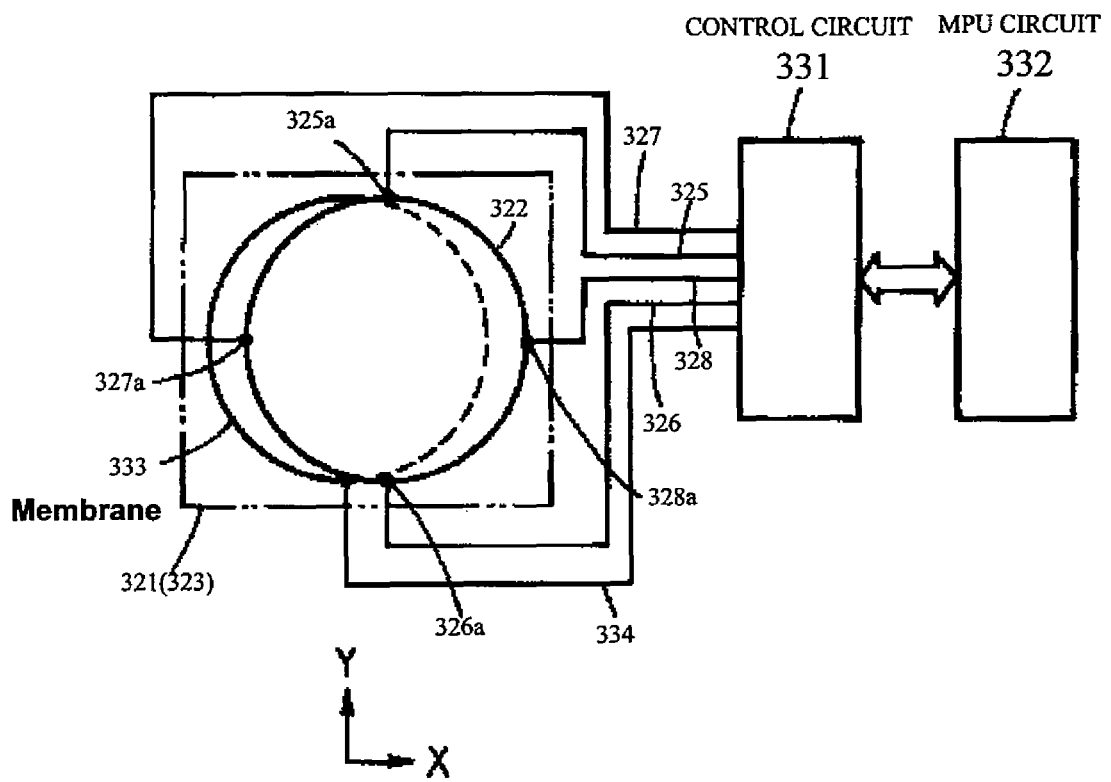
FIG. 17 illustrates a typical touch panel provided with PD3 as the prior art.

On the other hand, the freedom of the design can be improved since the touch panel having the circular shape is also utilized by mounting the touch panel 4 onto the display device 90 even in the case the shape of the display device is circular as shown in FIG. 14.

EXPLANATIONS OF SYMBOLS 2 touch panel
4 touch panel section
6 FPC
6a FPC
6b FPC
8 scanning circuit
10 detection circuit
12 calculation circuit
14 upper substrate
16 lower substrate
18 transparent conductive film
20 dot spacer
22 insulation layer
24 transparent conductive film
26 wiring
27, 29 wiring
28 opening of insulation layer
A, B, C, D, E electrode
30 electrode
34, 36 wiring
31 sealant
32 hole
38, 40 combination
F, G, I electrode
42 circumference of substrate
44 touch panel
46 touch panel section
48 FPC
48a FPC
48b FPC
50 scanning circuit
52 detection circuit
54 calculation circuit
56 upper substrate
58 lower substrate
60 transparent conductive film
62 transparent conductive film
64 dot spacer
66 architrave region
68 organic insulation layer
69 opening formed in organic insulation layer
70 hole
72 electrode
74, 78 wiring
76 sealant
80, 82, 84 wiring
90 display device

What is claimed is:

1. A touch panel detecting a touched position using the principle of Apollonius' circles, said touch panel comprising:
   two substrates, each of which is formed a transparent conductive film thereon, placed in the manner that said each transparent conductive film is facing each other,
   a first substrate having one electrode thereon,
   a second substrate having two pairs of point electrodes, wherein said point electrodes formed on said second substrate are arranged in a circumference region of said second substrate,
   an insulating layer formed in said circumference region excluding the region where said two pairs of point electrodes are formed, and
   wirings extracting said two pairs of point electrodes outwards formed on said insulation layer and arranged in the region inner than said two pairs of point electrodes are formed,
   wherein the procedures of the touched position detection of said touch panel comprises:
   calculating a first ratio of the two distances from the touched position to said two point electrodes using the detected electric voltages of said first substrate by applying the electric voltages to one pair of said electrodes formed on said second substrate,
   calculating a first trajectory fulfilling the condition that said first ratio keeps a constant value by using the principle of Apollonius' circle,
   calculating a second ratio of the two distances from the touched position to said two point electrodes using the detected electric voltages of said first substrate by applying the electric voltages to another pair of said electrodes formed on said second substrate,
   calculating a second trajectory fulfilling the condition that said second ratio keeps a constant value by using the principle of Apollonius' circle, and
   calculating the touched position as the intersection point of said first and second trajectories.

2. The touch panel according to claim 1,
   wherein said touch panel comprises
   a first wiring formed on said first substrate connected to a detection circuit,
   a second wiring formed on said second substrate connected to a scanning circuit, and
   a calculation circuit used for detecting a touched position.

3. The touch panel according to claim 1,
   wherein said calculation circuit has functions compensating the aging variations of the resistance values of said transparent conductive films formed on said first and second substrates and compensating the detected position errors caused by the distortions of the electric fields in the edge regions of said transparent conductive films and in the vicinity of said electrodes in the process of touched position calculation.

4. The touch panel according to claim 1,
   wherein said scanning circuit applies an electric voltage to one pair of said electrodes formed on said second substrate and then applies the electric voltage with inverting the polarity, and
   the same procedures are performed to the other pair of said electrodes formed on said second substrate.

5. The touch panel according to claim 1,
   wherein said first and second substrates have circular (or oval) shapes.

6. The touch panel according to claim 1,
   wherein said first and second substrates have rectangular shapes and said two pairs of the point electrodes are formed in the corner of said second substrate.

7. The display device mounting said touch panel according to claim 1.

* * * * *